United States Patent [19]

Dory

[11] 4,174,634
[45] Nov. 20, 1979

[54] ECHOGRAPHIC DEVICE FOR THE REAL-TIME DISPLAY OF INTERNAL DISCONTINUITIES OF A TEST OBJECT

[75] Inventor: Jacques Dory, Meaux, France
[73] Assignee: C.G.R. Ultrasonic, Meaux, France
[21] Appl. No.: 866,709
[22] Filed: Jan. 3, 1978
[30] Foreign Application Priority Data
Jan. 4, 1977 [FR] France .............................. 77 00082

[51] Int. Cl.² ............................................ G01N 29/00
[52] U.S. Cl. .................................................. 73/606
[58] Field of Search ................. 73/603, 604, 605, 606, 73/607, 608; 340/3 R, 5 MP; 128/2 V, 2.05 Z

[56] References Cited

U.S. PATENT DOCUMENTS

| | | | |
|---|---|---|---|
| 3,685,008 | 8/1972 | Bhuta et al. | 73/608 |
| 3,959,770 | 5/1976 | Schaefer | 340/5 MP |
| 4,006,627 | 2/1977 | Bossaert | 73/608 |

OTHER PUBLICATIONS

Hanstead; "A New Ultrasonic Focusing System for Materials Inspection", *J. Phys. D: Appl. Phys.;* vol. 7, 1974, pp. 226-241.

*Primary Examiner*—Stephen A. Kreitman
*Attorney, Agent, or Firm*—Karl F. Ross

[57] ABSTRACT

A real-time display device or fast imager for ultrasonic echography comprises a first electroacoustic transducer array 2 for periodically and simultaneously emitting a multiplicity of parallel ultrasonic wave trains toward a body O to be examined and receives from it reflected ultrasonic wave trains which it converts into electrical echo signals. These signals are transmitted through respective amplifiers 4 to a second electroacoustic transducer array 3 or 30 which retransmits them in the form of regenerated ultrasonic waves to an acousto-optical converter including a transparent tank 5 which contains a piezo-optical liquid 6, serving as an acousto-optical interaction medium, wherein the regenerated waves are focused by one or two focalizing elements, i.e. acoustic lenses and/or mirrors or simply by an arcuate shape of the second transducer array 30. The ultrasonic wavefronts form streaks or schlieren at image points spatially correlated with reflection-generating points of the test object O, these schlieren coming into existence in an image space of the tank at different instants depending upon the spacing of the respective object points from the first transducer array 2. The image space is transluminated by an oscillating light beam of narrow elongate cross-section whose velocity matches the apparent schlieren speed in the direction of wave propagation; the diffracted part of the beam, clearing a spatial filter or mask, is intercepted by a visualizer such as a vidicon tube.

20 Claims, 10 Drawing Figures

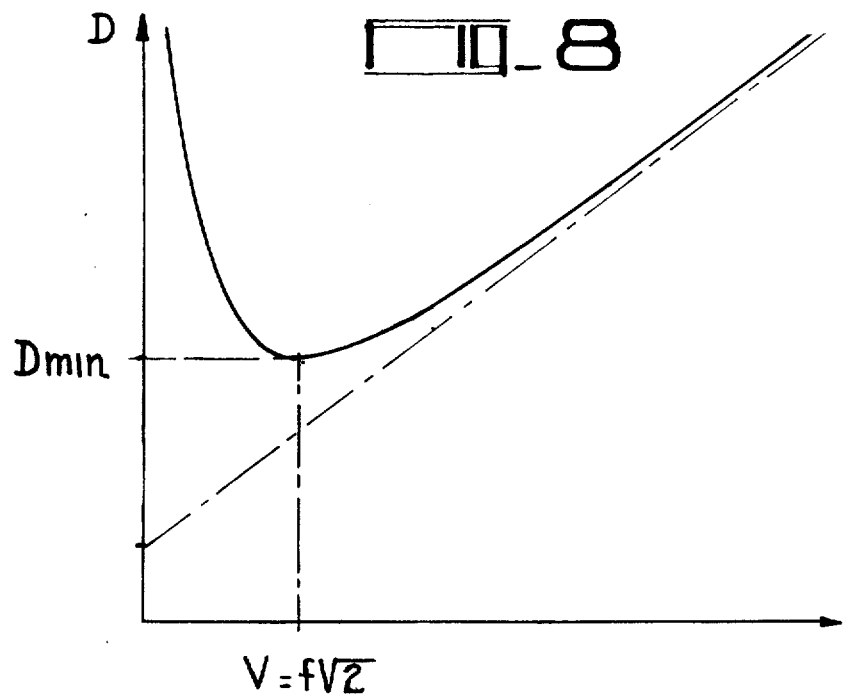
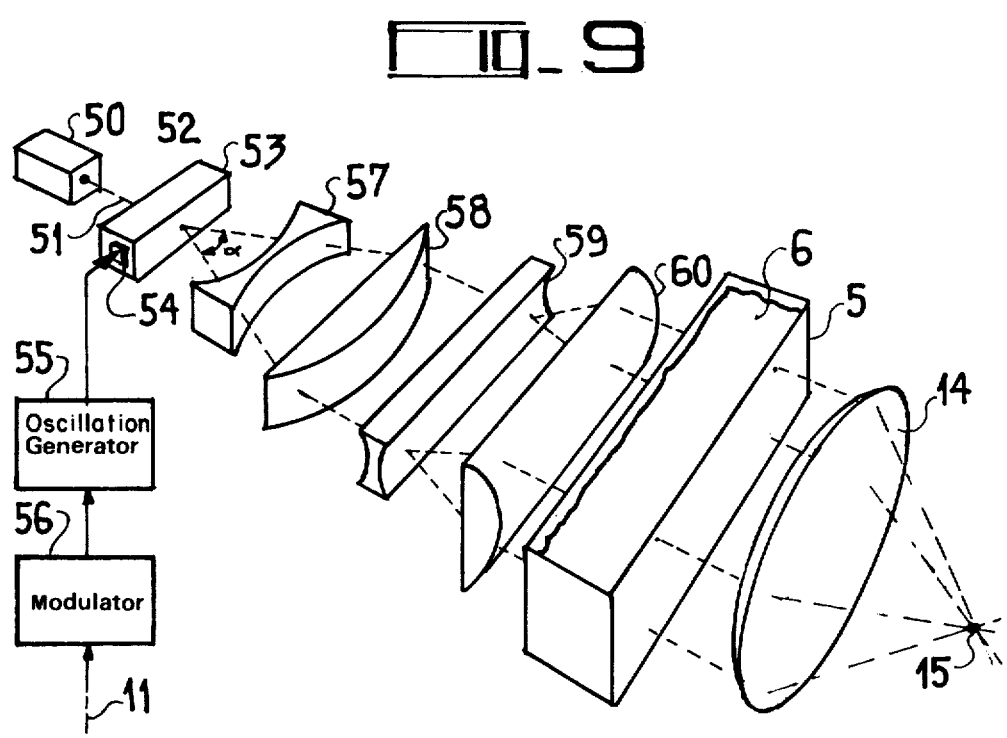

ECHOGRAPHIC DEVICE FOR THE REAL-TIME DISPLAY OF INTERNAL DISCONTINUITIES OF A TEST OBJECT

FIELD OF THE INVENTION

My present invention relates to a real-time display or fast-imaging device for an ultrasonic echography apparatus, using a transluminable acousto-optical interaction medium such as a transparent tank filled with a piezo-optical liquid whose optical refractive index varies as a function of the pressure variations produced by the acoustic waves passing through the medium. The acoustic waves generate streaks or schlieren in the interaction medium, made visible by a light-beam, which is roughly perpendicular to the propagation plane of these waves, transluminating that medium.

BACKGROUND OF THE INVENTION

In an article by P. D. Hanstead entitled "A new ultrasonic focusing system for materials inspection" in the British periodical "Journal of Physics D: Applied Physics", Vol. 7, 1974, pp. 226 to 241, as well as in British patent No. 1,364,254, a direct-fault-display system by ultrasonic echography using the schlieren (strioscopic) method is described in which the object to be examined is coupled to an electroacoustic transducer subjecting it to periodic ultrasonic pulses and in which acoustic waves reflected by structural discontinuities (faults) are retransmitted by the transducer to an acousto-optical interaction cell that includes a transparent tank containing a piezo-optical liquid medium (water) and an acousto-optical system with two aligned cofocal acoustic lenses (afocal system). The acoustic waves which propagate in the medium fork streaks or schlieren at image points correlated with respective object points that are made visible by an optical system illuminated by a stroboscopic source.

However, such a system has large acoustic-energy losses due to attenuation through the object, transducer, piezo-optical medium and acoustic lenses and multiple reflections at interfaces between media of different densities which weaken the system's response.

OBJECT OF THE INVENTION

The object of my present invention is to provide a device of the aforedescribed character which avoids some of the drawbacks of earlier systems and improves on their performance.

SUMMARY OF THE INVENTION

An echographic device according to my invention comprises first electroacoustic transducer means juxtaposable with a test object to be examined, excited by a source of recurrent electrical signals of ultrasonic frequency to emit original ultrasonic wave trains into the test object and to reconvert reflections thereof from internal object points into electrical echo signals, and second electroacoustic transducer means electrically connected to the first transducer means for receiving the echo signals therefrom and converting them into regenerated ultrasonic wave trains to be transmitted in a predetermined general direction of travel by a transluminable interaction medium in contact with the second transducer means for insonification thereby. These regenerated wave trains are concentrated within the interaction medium by acoustic focusing means onto image points that are spatially correlated with respective reflecting object points whereby schlieren differing in density from the surrounding medium are temporarily generated at these image points, generally as described in the aforementioned Hanstead article and British patent. Whereas, however, these prior systems use afocal acoustic means of a predetermined focal-length ratio to let the schlieren come into existence simultaneously, my improved device dispenses with that limitation and also eliminates the need for stroboscopic illumination by using a moving light beam of laminar shape from transluminating the interaction medium. Thus, in the general case here envisaged, the schlieren produced by the acoustic focusing means appear in an image space of the medium with delays—measured from the time of excitation of the first transducer means—which are a function of the distances of the reflecting object points from that first transducer means and which establish an apparent schlieren speed in the direction of travel. The image space is transluminated by the laminar light beam which is generated by first optical means on one side of the interaction medium and has a narrow cross-section elongate in a direction substantially perpendicular to the direction of travel, the first optical means being coupled with sweep means synchronized with the source of ultrasonic-frequency signals for displacing the beam parallel to itself in the direction of travel over at least a part of the image space with a velocity substantially corresponding to the apparent schlieren speed and at times coinciding with the schlieren formation in the region swept by the beam; this results in a diffraction of some of the light rays of the beam as they encounter the schlieren successively developing at image points defined by progressively lengthening wave paths. On the opposite side of the medium, the light rays so diffracted are focused by second optical means upon a receiving surface, such as that of an image-storing camera tube, to visualize these image points.

The acoustic focusing means of my improved device may take a variety of forms. Since afocality is no longer required, I may use a single focalizing element such as an acoustic lens or mirror; however, the provision of two such focalizing elements—even cofocal ones—is not excluded since, as will be shown hereinafter, with a focal-length ratio different from $\sqrt{2}$ they will also give rise to schlieren coming into existence at different instants. In a simplified system, the acoustic focusing means may be formed entirely or in part by the sound-emissive faces of a multiplicity of electroacoustic transducers constituting the aforementioned second transducer means, these faces being arrayed within the interaction medium along an arc whose center of curvature lies within the medium; such an arcuate transducer array may be employed alone or together with an additional focalizing element having a focal point coinciding with the center of curvature of the array.

BRIEF DESCRIPTION OF THE DRAWING

The above and other features of my invention will now be described in detail with reference to the accompanying drawing in which:

FIG. 8 is a graph showing the variation in the path length of the acoustic waves between an array of ultrasonic transducers and the image points corresponding to reflecting obstacles in a test object as a function of the distance between these points and the transducer array;

FIG. 9 shows schematically and in perspective view an optical lighting system which is part of a display device in accordance with the invention; and FIG. 10 is a face view of a spatial filter to be used with my improved display device.

SPECIFIC DESCRIPTION

Figure 1:
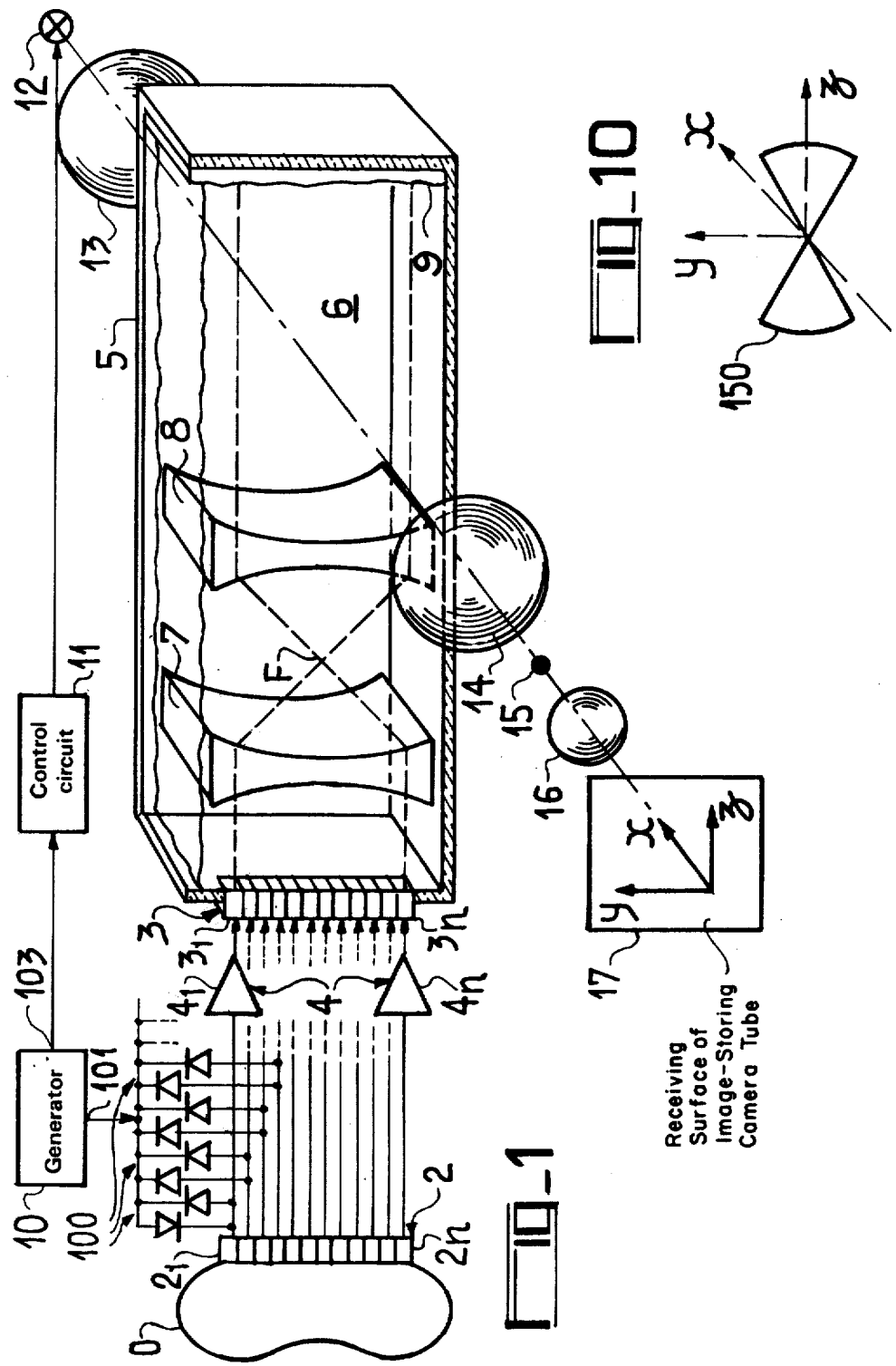
FIG. 1 is a partly diagrammatic and partly perspective sectional view of an ultrasonic display device using an acousto-optical converter of the afocal type described in the aforementioned Hanstead article, adapted for use in medical echography.

In FIG. 1 I have shown an echography apparatus comprising a transmitter 10 formed by a generator of recurrent electrical pulse trains of ultrasonic frequency which feeds in parallel, through separation circuits 100 each constituted by a pair of antiparallel diodes, a multiplicity of piezo-electric transducers $2_l$ to $2_n$ lined up and assembled in a first probe or array 2. Transducers $2_l$ to $2_n$ convert the pulse trains supplied by generator 10 into acoustic waves which propagate, roughly parallel to the axes of all the transducers, in the object O to be examined to which they are coupled, for example, by direct contact. When the acoustic waves meet obstacles or discontinuities inside test object O, formed by the transitions between two zones of different densities (acoustic impedance), they are partially reflected by the interface between the two zones toward the emitting transducer array 2.

On reaching transducers 2, the reflected acoustic waves are converted by them into electrical echo signals of much smaller amplitude than that of the exciting pulses supplied by generator 10. Because of their low level, these electric signals are isolated from the output 101 of transmitter 10 by the thresholds of the diodes in separation circuits 100 and are applied respectively to the inputs of as many amplifiers $4_l$ to $4_n$ designated collectively as 4. Amplifiers $4_l$ to $4_n$ feed a linear assembly of transducers $3_l$ to $3_n$ which form a second probe or array 3 similar to the first array 2.

This second array 3 is coupled to a piezo-optical liquid 6 forming an acousto-optical interaction medium which makes possible the visual representation of the regenerated acoustic waves by diffraction and is contained in a tank 5, here in the shape of a rectangular prism, having transparent sidewalls parallel to the plane of wave propagation.

Along the path of the ultrasonic waves emitted by the transducers of the second array 3, inside tank 5, I provide focusing means formed here by an afocal system of two convergent acoustic lenses 7 and 8, cofocally aligned, i.e. with their respective focal points coinciding at F in the space between them.

Such a system, which is known in optics, has the property that the image reproduces the object faithfully with a transverse inversion of lateral transposition around the system's axis; in the Hanstead article this property has been called "linearity". Under these conditions, the distance between the two lenses is the sum of their focal lengths.

In conformity with the teachings of that article, the distances traveled by the acoustic waves between the transducers of the first array 2 and the image points beyond the afocal acoustic-lens system 7, 8, after reflection at the object points, must be independent of the distance U (see FIGS. 5–7) which separates the object points from array 2, i.e. the streaks or schlieren marking the image points must all appear at the same instant after the emission of the ultrasonic wave. For this purpose, afocal system 7, 8 would have to satisfy another condition of simultaneity or isochronicity. This condition has been analyzed in the Hanstead article mentioned above and is satisfied in the case in which $f_2$ is equal to $f_1\sqrt{2}$ where $f_1$ is the focal length of the first lens 7 and $f_2$ is that of the second lens 8. This implies that the distance V (cf. FIG. 5) between the adjacent focal point of second lens 8 and the image point corresponding to a given object point is equal to twice the distance U between this object point and the first transducer array 2.

To sum up, the acoustic waves reflected by obstacles (acoustic-impedance transitions) which form the objects to be visualized arrive simultaneously at the position of their image, after having been received and converted by transducers $2_l$ to $2_n$ of first array 2, amplified by amplifiers $4_l$ to $4_n$ and retransmitted by transducers $3_l$ to $3_n$ of second array 3 and after having been processed by lens system 7, 8, and can be made visible by acousto-optical conversion such as the well-known schlieren-translumination method.

The prior-art technique consists in intermittently transluminating, at least in part, the space between second lens 8 and the rear of tank 5, which is covered with a non-reflecting layer 9 absorbent for vibration. This space, here called the image space, is illuminated by a beam of parallel light rays roughly perpendicular to the acoustic-wave-propagation plane and produced by a stroboscopic point source 12 at the focal point of a first convergent optical lens 13 located on the far side of the tank as viewed in FIG. 1; the point source may be realized by means of a small-aperture diaphragm. The parallel-ray beam, after passing through the tank 5 and the piezo-optical liquid 6, is partially diffracted by the presence of the ultrasonic acoustic waves (by the variations in medium density, i.e. in refractive index, which are localized in the liquid and produced by these waves). Upon emerging from the other side of tank 5, the light beam is refocused by a second convergent optical lens 14.

The non-diffracted part of the beam is then intercepted by a spatial filter here designed as a nearly punctiform mask 15 at the focal point of the second lens 14.

The diffracted part of the light beam is not stopped and is projected through another lens or objective 16 on a screen 17 which may be formed by the target (photosensitive surface) of an image-pickup tube or vidicon-type television camera, preferably one provided with image-storing means.

Stroboscopic point source 12 must emit very short pulses of light with a predetermined delay relative to the recurrent wave trains supplied by transmitter 10 to the transducer array 2, this delay corresponding to the propagation time of the acoustic waves. For this purpose, another transmitter output 103 supplies control pulses to a circuit 11 delaying and controlling the light source 12. This stroboscopic source 12 may be constituted by a directly modulatable light emitter, such as a flasher or a laser, or may be formed by placing in front of a constant-light emitter a light modulator such as an acousto-optical or electro-optical modulator for a laser beam or a Kerr or Pockels cell, for example.

It is also possible to place the light modulator at the input of the image receiver 17, i.e. to provide the latter with an adjustable image intensifier.

Convergent acoustic lenses 7 and 8 shown in FIG. 1 are cylindrical and, unlike those of an optical objective, concave. They are made of solid material, such as a plastic of the acrylic-polymer group, having a density and a sound-propagation velocity higher than those of the surrounding liquid.

Because of this, there are abrupt transitions in the acoustic impedance along the path of the ultrasonic waves, causing energy losses by reflection of the waves at the lens surfaces and interference signals produced by multiple reflections at these same surfaces.

In order to avoid the undesirable effects mentioned above, in accordance with the object of the invention, I prefer to use mirrors as the focusing means.

Figure 2:
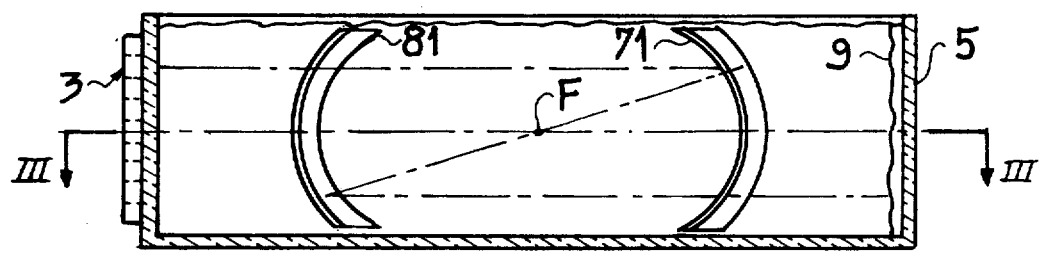
FIG. 2 shows in sectional elevation, taken on the line II—II of FIG. 3, a tank for a piezo-optical liquid containing an improved converter for a display device according to my invention.
Figure 3:
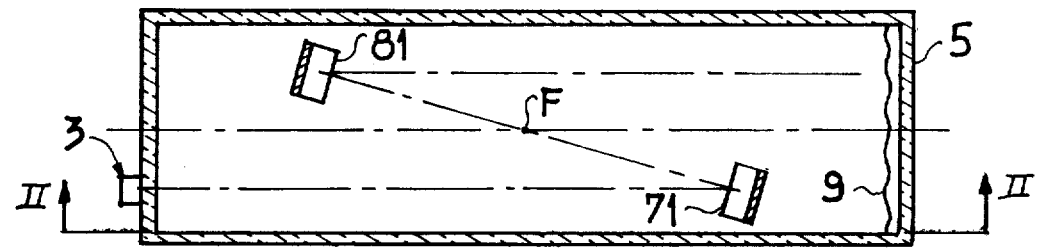
FIG. 3 is a cross-sectional view taken on the line III—III of FIG. 2.

In the embodiment of FIGS. 2 and 3, the transducer array 3 is secured to the front face of tank 5 but slightly off-center to emit ultrasonic waves in a direction parallel to the longitudinal axis of tank 5 toward a first concave mirror 71 (either cylindrical or conical) whose generatrices are inclined with respect to a straight line perpendicular to the axis of tank 5. The beam reflected by first mirror 71 is directed toward a second, similar mirror 81 disposed symmetrically thereto with reference to the tank axis, the two mirrors having a common focal point F and mutually parallel generatrices in order to make the path of the ultrasonic wave beyond mirror 81 parallel to that axis. Mirrors 71 and 81 are made of a very rigid, high-density material such as a metal or hard plastic to give maximum reflection. In such a device, the beam path between the mirrors is in the form of a Z.

Figure 4:
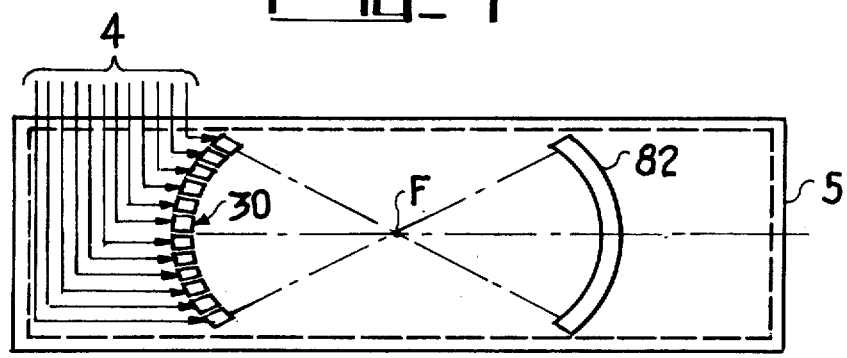
FIG. 4 shows, in elevation, a simplified construction of the device illustrated in FIGS. 2 and 3.

FIG. 4 shows a simplified device in which the first mirror has been replaced by a concave array 30 of transducers, immersed in the liquid 6 and fed by the amplifiers 4 of FIG. 1, whose sound-emissive faces form a cylindrical surface and, as a result, transmit the regenerated ultrasonic waves through the center of curvature of this surface to a single cylindrical mirror 82 whose focal point F coincides with this center.

In the devices shown in FIGS. 2 to 4, the focal point F and the image space are both located between mirrors 71 and 81 or between the arcuate transducer array 30 and mirror 82. As a result, the delay in triggering the stroboscopic light source (12, FIG. 1) is such that the illumination of this space occurs only after reflection of the emitted wave by mirror 81 or 82.

Such devices make it possible, on the one hand, to reduce the dimensions of tank 5 and, on the other hand, to prevent energy losses and interference signals which are due to the multiple reflections in the acoustic lenses while giving equivalent results.

In commonly owned U.S. Pat. No. 4,006,627 there has been described a system using assemblies similar to arrays 2 and 3, each consisting of a number of highly directional ultrasonic transducers, which does not include focusing by lenses or mirrors in an associated tank and in which the individual radiation diagrams must not overlap, i.e. in which the diameters of the individual transducers must be greater than the acoustic wavelength in order for a given reflecting obstacle to be acoustically excited by only one sound-emitting transducer. In comparison with that system the resolution (definition) of the device according to my invention as illustrated in FIGS. 1 to 4 is much better because the focusing means make it possible to reconstruct nearly punctiform obstacles even if they are insonified, i.e. struck by sound waves, from several neighboring transducers. This is true even if the obstacles reflect the incident sound waves to several transducers because the focusing means enable the fronts of the waves emitted by several transducers of array 3, which originate at the same object point, to produce at a given instant an image point at the intersection of these wavefronts.

The intersection points of the acoustic wavefronts give rise to schlieren which significantly differ in density from their surroundings and thus enable the image points to be localized with precision.

As a result, the quality of the image will depend on the sharpness of the sampling of the ultrasonic field by arrays 2 and 3, i.e. on the number of transducer elements used. Hence, it is possible, in order to limit the loss of information due to sampling, to reduce the dimensions of the sound-emissive faces of the individual transducers to less than the acoustic wavelength. It therefore becomes possible to provide about a hundred transducers in each array.

In a preferred embodiment of my invention, only one acoustic focusing element is used, i.e. an acoustic lens or mirror immersed in the acousto-optical interaction medium along the path of the ultrasonic acoustic waves emitted by transducer array 3, in order to reduce losses and multiple reflections. Such a device retains the advantages of the devices shown in FIGS. 1 to 4 as far as sampling losses and the reconstruction of image points by intersections of wavefronts are concerned. On the other hand, the image points or schlieren corresponding to the various object points are not longer reached simultaneously and neither permanent nor stroboscopic lighting can be used. Hence the optical system must allow different points in the image space to be illuminated at different instants to allow for the difference in the path lengths of the acoustic waves between the object and image points. Hereinafter, such a device will be called an asynchronous sytem because the image points are not all reached simultaneously. Also, an asynchronous system is not homothetic.

Figure 5:
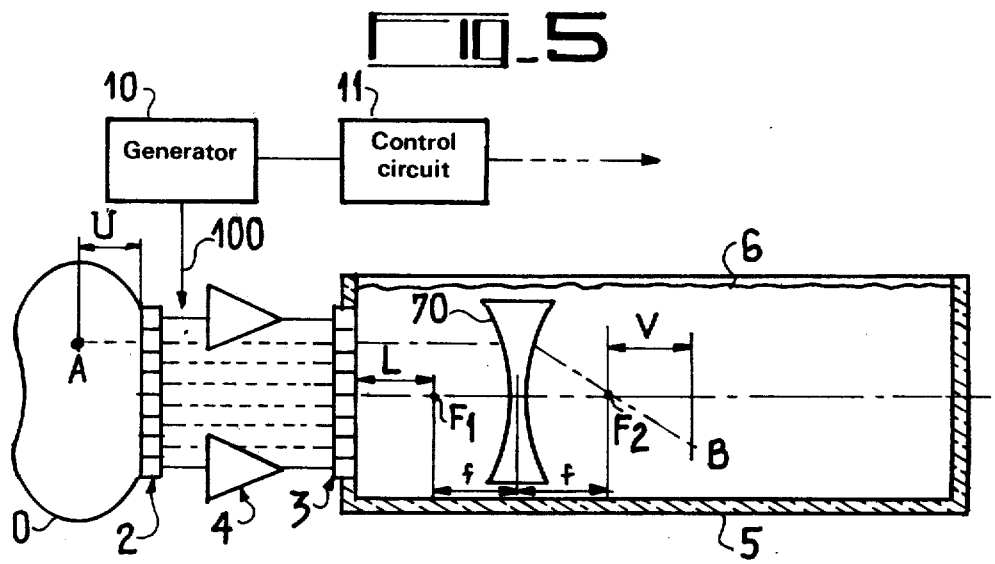
FIGS. 5, 6 and 7 show, in sectional elevation, various converters included in a display device according to my invention.
Figure 6:
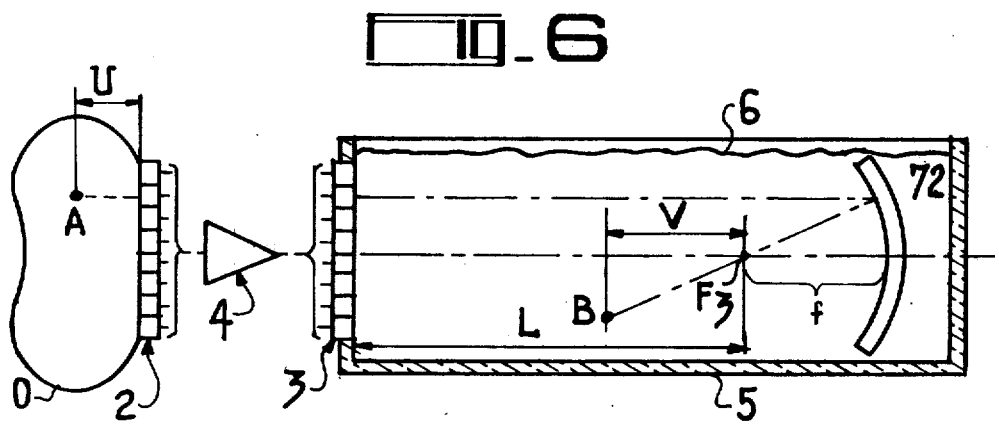
Figure 7:
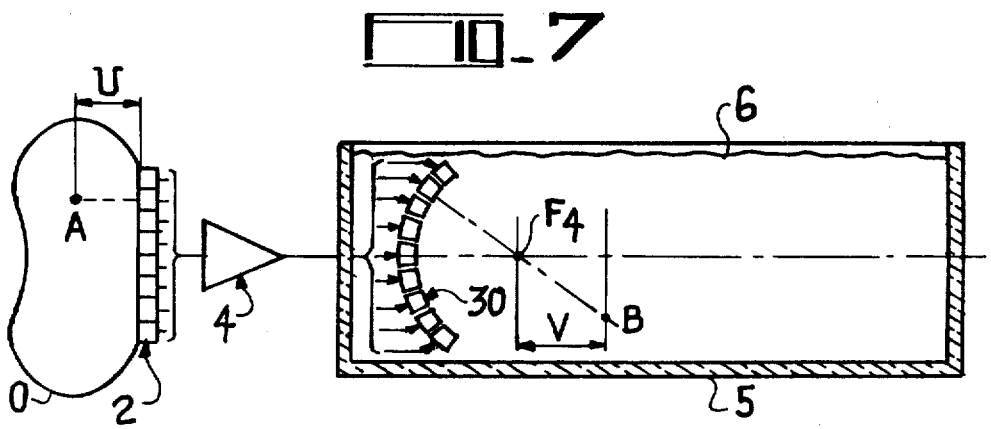

FIGS. 5, 6 and 7 show in section and in elevation different constructions of the acoustic part of an asynchronous display device in accordance with the invention.

In the asynchronous display devices of FIGS. 5, 6 and 7, the elements common to the synchronous devices of FIGS. 1 to 4, such as object O, transmitter-receiver array 2, amplifiers 4, retransmission array 3 or 30, transparent tank 5 and acousto-optical interaction liquid 6, have been identified by the same reference numerals. The acoustic part shown in these Figures, i.e. the region in which the regenerated ultrasonic waves propagate, contains only one acoustic wave-focusing element in these instances.

This acoustic focusing element is formed in FIG. 5 by an acoustic lens 70, similar to lenses 7 and 8 shown in FIG. 1, placed at a distance $L+f$ from the sound-emissive surface of retransmission array 3, where L is the distance between this surface and the focal point $F_1$ of lens 70 and f is the focal length of the latter.

In FIG. 6, the acoustic focusing element is formed by a cylindrical acoustic mirror 72, which is similar to mirrors 71, 81 and 82 of FIGS. 2 to 4 and is disposed in tank 5 opposite the straight retransmission array 3 near the other end of the tank at a distance L+f from that array where L is the distance between array 3 and the focal point F₃ of mirror 72 and f is the focal length or radius of curvature of the latter.

In FIG. 7, the arcuate retransmission array 30 is arranged, as in FIG. 4, so that the sound-emissive faces of the transducers are disposed along a cylindrical surface whereby the regenerated ultrasonic waves pass through a focal point F₄ at the center of curvature of this cylindrical surface.

In order to determine the movements of the light beam which enable the image point B to be visualized by acousto-optical interaction, it will be necessary to know the length of the path D of the ultrasonic acoustic waves between the array 2, which emits them through a reflecting object point A, and the image point B corresponding to this point A.

In a first approximation, this may be written:

$$D = 2U + L + 2f + V \qquad (1)$$

where:
U is the distance between array 2 and object point A,
L is the distance between array 3 and the adjacent focal point F₁ (FIG. 5) or F₃ (FIG. 6),
f is the focal length of lens 70 (FIG. 5) or mirror 72 (FIG. 6), and
V is the projection on the axis of the acousto-optical system of the transit distance of the wave processed by the focusing means (70, FIG. 5, or 72, FIG. 6) between focal point F₂ or F₃ and image point B corresponding to the above-mentioned object point.

In accordance with Newton's law, $(U+L)V = f^2$; substituting this in equation (1) yields:

$$D(V) = -L + 2f + 2(f^2/V) + V \qquad (2)$$

FIG. 8 shows the path length D plotted against object-point distance U and image-point distance V.

This function D(V) has the same value for two separate values of V on opposite sides of the value $V = f\sqrt{2}$ which corresponds to the minimum path length $D_{min} = 2f(1 + \sqrt{2}) - L$. Also, when V tends to zero, D tend to infinity; for V >> f, D asymptotically approaches a linear function of V, i.e. a value $-L + 2f + V$.

To obtain a single value of D(V), the image space must be chosen in FIG. 5 to accommodate values of V greater than $f\sqrt{2}$. In this case, the light beam must be flat and of elongate cross-section substantially perpendicular to the direction of propagation of the acoustic waves and must sweep the image space in such a manner that at any instant only those zones are illuminated which correspond to ultrasonic wavefronts that have reached their image points after being focused by the acousto-optical element (lens 70 or mirror 72).

With respect to the instant $t_o$ of emission of the ultrasonic wave by transducer array 2, a point on the axis of the optical system at distance V from focal point F₂ or F₃ must be illuminated roughly at the instant $$t = D(V)/C \qquad (3)$$

where C is the mean velocity of propagation of the ultrasonic wave in water or human tissue (about 1500 meters per second). If the relationship of equation (2) is substituted in this expression, then $$t = \frac{1}{C}(-L + 2f + V + 2\frac{f^2}{V}) = \frac{-L + 2f}{C} + (V + \frac{2f^2}{V})\frac{1}{C} \qquad (4)$$

This gives for V the following quadratic equation:

$$V^2 + (-L + 2f - Ct)V + 2f^2 = 0 \qquad (5)$$

whose solution establishes the position of the light beam as a function of time:

$$V_{1,2} = -\frac{-L + 2f - Ct}{2} \pm \sqrt{\frac{(-L + 2f - Ct)^2}{4} - 2f^2} \qquad (6)$$

The beam-sweep velocity v at each point B of given image distance V may be obtained by differentiating equation (3) which yields $$dt = dD(V)/C \qquad (7)$$

whence, from equation (2), $$\frac{dt}{dV} = \frac{1}{C} \cdot \frac{dD(V)}{dV} = \frac{1}{C}(1 - \frac{2f^2}{V^2}) \qquad (8)$$

and by inverting the resulting differential quotient:

$$v = \frac{dV}{dt} = \frac{CV^2}{V^2 - 2f^2}. \qquad (9)$$

This sweep velocity or apparent schlieren speed becomes infinite for $V = f\sqrt{2}$ and approaches C asymptotically with increase in distance. Because of the high velocity and non-linearity of beam motion near the focal point, it is not possible to use mechanical sweep means, such as vibrating or rotating mirrors, but acous-to-optical or electro-optical light deviators must be used. For V > f, the function D(V) will be almost linear and a longitudinal sweep motion varying almost linearly with time can be given to the oscillating light beam.

In FIG. 9 I have shown schematically and in perspective a translumination system with a beam sweep using an acousto-optical deflector.

In such a system, the light source is formed by a laser 50 which emits a parallel-ray light beam of small cross-section, i.e. a pencil 51, toward a conventional acousto-optical deflector 52 containing a transparent crystal 53 and an ultrasonic transducer 54 to which is applied a high-frequency electric signal (150 to 300 MHz) supplied by an oscillation generator 55 frequency-modulated by means of a periodic sawtooth-shaped signal issuing from a modulator 56 which is triggered by control pulses coming from delay device 11 (FIG. 1).

The supersonic vibrations generated by transducer 54 set up an acoustic wave which propagates in crystal 53 and periodically modifies the refractive index n of the crystal in order to obtain a diffraction of ray pencil 51 which causes a recurrent progressive deflection of the latter by an angle α related to the frequency of the acoustic wave.

The deviated beam is applied to a cylindrically biconcave first lens 57 which here represents an optical system divergent in the horizontal plane (i.e. the plane of deflection) enabling the maximum deviation of about 20 milliradians caused by crystal 53 to be increased to about 20 degrees.

A cylindrically planoconvex second lens 58 follows lens 57. This second lens 58 is convergent in the horizontal plane and reorients the beam in a direction parallel to the optical axis no matter what its incident angle. Thus a beam is obtained which moves parallel to itself and which is applied to a cylindrically biconcave third lens 59 divergent in the vertical plane.

Third lens 59 supplies a narrow output beam in the form of a flat, sector-shaped ray bundle whose elongate cross-section lengthens with increasing distance from the vertex. This thin divergent ray bundle is then applied to a cylindrically planoconvex fourth lens 60 which is convergent in the vertical plane to produce a narrow laminar beam of constant width that oscillates in a scanning sweep parallel to the focal axis of this fourth lens 60. It is this beam which illuminates the image space in tank 5 from one side.

On the other side of the tank, there is a spherically convergent fifth lens 14 which, as also shown in FIG. 1, is followed by the blocking spatial filter 15 at the point of convergence of the undiffracted light rays, i.e. the remote focal point of lens 14. Thus, lens assembly 57–60 takes the place of lens 13 in the optical system of FIG. 1.

This is only one example of a possible structure of the optical sweep system to be used for scanning the image space of a device according to my invention; other, equivalent solutions will be readily apparent to persons skilled in the art.

Piezo-optical liquid medium 6, transparent tank 5 which contains it, retransmission array 3 which acoustically excites or insonifies the medium 6 and the convergent acoustic focusing means (lens or mirror) immersed therein, as well as the translumination optical system, with its oscillating laminar light beam diffracted by the ultrasonic waves passing through the medium 6 as shown in FIG. 9, form together an acousto-optical converter enabling the visualization, beyond spatial filter 15, of image points B corresponding to object points A which supply echoes in response to ultrasonic waves emitted by transducer array 2.

The visual image of any point B can be picked up downstream of spatial filter 15, which lets pass mainly the diffracted parts of the illumination beam, preferably by means of a television camera including an input objective such as the lens 16 of FIG. 1. Unlike the synchronous device of FIGS. 1 to 4, the sole convergent acoustic focusing element 70, 72 or 30 of FIGS. 5–7 does not give a homothetic image of the object either along its axis (horizontally) or perpendicularly to this axis (vertically). The distance V between the ordinate of image point B and the second focal point ($F_2$, FIG. 5), in accordance with Newton's law, is inversely proportional to the effective distance $V + L$ between the first focal point ($F_1$, FIG. 5) and the object point A as discussed above; on the other hand, the distance between image point B and the focal axis increases linearly with the distance V.

This geometrical distortion can be compensated by an inverse distortion of the scanning sweep of the target in the camera tube and/or of the screen of an associated cathode-ray display tube.

Such a display device gives very good resolution in the direction of propagation (z, FIG. 1) of the ultrasonic waves. The transverse resolution in the direction perpendicular to this propagation (along axis y) is limited by the definition provided by the individual transducers of arrays 2 and 3.

The transverse resolution of the device along an axis (x) perpendicular to the plane of propagation (x y) of the ultrasonic waves may be improved by using systems of variable focal length which successively sweep different areas of the object to be examined. In this case, the illumination by the moving beam will be limited to the corresponding zones of the image space.

It may be noted that the transverse resolution (along axis y) may also be improved by modifying the spatial filter 15, i.e. by replacing the quasi-punctiform mask by a butterfly-shaped filter 150 as shown in FIG. 10. This spatial filter consists preferably of two diametrically opposite sectors of a circle whose aperture angle corresponds to the maximum slope of the direction of propagation of the ultrasonic waves at the output of the acoustic focusing means. Such a spatial filter eliminates almost all the diffracted orders which do not correspond to intersections of the acoustic wavefronts.

The dimensions of the area explored on the object are limited by the dimensions of the transmitter-receiver array or probe 2. However it is possible to combine a multiple probe 2 with a conventional type-B echography pantography which transmits the probe coordinates and transmission direction to the sweep circuit of a storage tube (of the image-retention or recording type) in a known manner to supply a global image obtained by the movement of the probe around the object. A type-B scan is described in the Hanstead article referred to above.

The quality of the images obtained by means of such a device can be improved by the reduction of the effects due to the secondary lobes of the probes by frequency-modulating the ultrasonic signal. The direction and gain of the secondary lobes vary with the frequency emitted and, if the image is integrated over several successive recurrences (by means of a storage tube), varying the ultrasonic frequency from one recurrence to the next results in a spreading of the secondary lobes which reinforces the useful image point due to the main lobe.

It is also possible to use two separate probes coupled to the object, one for transmission and the other for reception of the reflected waves.

Although I have particularly described several embodiments of the invention in which the acousto-optical interaction medium is a liquid contained in a tank, the acoustic focusing means being immersed in this liquid, other arrangements may be used for realizing my invention.

Thus, for example, the liquid acousto-optical medium may be replaced by a piezo-optical crystal. In this case there is obviously no tank. As for the lenses which form the acoustic focusing means, they are then included in the crystal in accordance with techniques known per se or replaced by acoustic mirrors placed at the end of the crystal.

It is also possible to realize the invention, in particular its embodiments shown in FIGS. 6 and 7, by using, as an acousto-optical interaction medium, a piezo-optical crystal in which the acoustic waves carrying the data to be displayed propagate only as surface waves. In this case, the transducers producing these waves are arranged on the propagation surface and the optical display system operates no longer by refraction but only by reflection.

The major disadvantages of an anisochronous or asynchronous display device with a single focusing element reside mainly in the serious geometrical distortion near the image-side focal point and the nonlinear variation of the propagation velocities of the image points as a function of the distance of the object points from the object-side focal point. These drawbacks can be eliminated by using in an anisochronous system two cofocal aligned focusing elements having respective focal lengths $f_1, f_2$ as described above with reference to lenses 7 and 8. A choice of a focal-length ratio $f_2/f_1$ different from the aforementioned value of $\sqrt{2}$ makes it possible to avoid a major disadvantage of an isochronous device, i.e. the constant enlargement $(f_2/f_1)^2 = 2$ in the axial direction of the acoustic focusing system.

It appears therefore very interesting to use an asynchronous display device whose acousto-optical converter has two focalizing elements as shown in FIGS. 1 to 4 with which an anamorphotic image of the object can be obtained in a simple manner. The image scale is $(f_2/f_1)^2$ in the direction of propagation (along the axis of the optical system) and $f_2/f_1$ in the transverse direction. Selection of a suitable focal-length ratio in a device of this type thus makes it possible to obtain a reduction of the image with respect to the object, which leads to substantial economies regarding the optical device as the cost of optical lenses increases significantly with their size.

Another major advantage of such a device is the constant velocity v of the image points, i.e. the apparent schlieren speed, and, as a result, that of the illuminating beam. This velocity v is here equal to $$\frac{c}{(f_2/f_1)^2 - 2}$$

where C is again the propagation velocity in the acousto-optical interaction medium.

The constant sweep velocity v of the beam in that case enables conventional optical systems to be used which are much simpler than the one shown in FIG. 9, e.g. systems comprising a vibrating mirror, a fast glavanometric mirror or a drum of mirrors rotating at constant speed.

The preferred structure of the acousto-optical converter for such as asynchronous device is similar to the one shown in FIG. 4. The immersed transducer array 30 with cylindrical transmitting surface shown in this Figure may be replaced by the combination of a flat array with a lens to reduce the cost if a diminished performance is acceptable.

It may be noted here that the distortion of the image by simple anamorphosis is easy to correct with the sweep velocities of the image-pickup tube in a television camera, for example.

What is claimed is:

1. An echographic device for displaying, in real time, internal discontinuities of a test object to be examined, comprising:

first electroacoustic transducer means juxtaposable with the test object;

a source of recurrent ultrasonic-frequency electrical signals connected to said first transducer means for exciting same to emit original ultrasonic wave trains into said test object and to reconvert reflections of said original wave trains from internal object points into electrical echo signals;

second electroacoustic transducer means electrically connected to said first transducer means for receiving said echo signals therefrom and converting same into regenerated ultrasonic wave trains;

a transluminable interaction medium in contact with said second transducer means for insonification thereby, said medium transmitting the regenerated wave trains in a predetermined general direction of travel;

acoustic focusing means in said medium for concentrating said regenerated wave trains onto image points spatially correlated with respective reflecting object points whereby schlieren differing in density from the surrounding medium are temporarily generated at said image points, said schlieren coming into existence in an image space of said medium with delays measured from the time of excitation of said first transducer means which are a function of the distances of said object points from said first transducer means and which establish an apparent schlieren speed in said direction of travel;

first optical means on one side of said medium generating a laminar light beam transluminating said image space, said beam having a narrow cross-section elongate in a direction substantially perpendicular to said direction of travel;

sweep means coupled with said first optical means and synchronized with said source for displacing said beam parallel to itself in said direction of travel over at least a part of said image space with a velocity substantially corresponding to said apparent schlieren speed and at times coinciding with the formation of schlieren in the region swept by the beam with resulting diffraction of light rays forming part of said beam; and second optical means on a side of said medium opposite said one side for focusing the diffracted light rays upon a receiving surface to visualize said image points.

2. A device as defined in claim 1 wherein said medium is a liquid contained in a tank with transparent sides.

3. A device as defined in claim 2 wherein said acoustic focusing means comprises at least one focalizing element immersed in said liguid at a distance from said second transducer means.

4. A device as defined in claim 3 wherein said focalizing element is an acoustic mirror with a concave reflecting surface.

5. A device as defined in claim 3 wherein said acoustic focusing means comprises a pair of focalizing elements having a common focal point and respective focal lengths with a ratio different from $\sqrt{2}$ for establishing a constant apparent schlieren speed in said image space.

6. A device as defined in claim 2 wherein said first and second transducer means each comprise a multiplicity of individual transducers respectively forming a first array and a second array, the transducers of said first array being connected in parallel to said source, the transducers of said second array lying in a common plane parallel to a major dimension of said tank and being individually connected to corresponding transducers of said first array.

7. A device as defined in claim 6 wherein the transducers of said second array are immersed in said liguid and have sound-emissive faces forming part of said acoustic focusing means, said faces being disposed along an arc in said plane centered on a focal point within said tank.

8. A device as defined in claim 7 wherein said acoustic focusing means further comprises a focalizing element confronting said faces and having a focal point coinciding with the center of curvature of said faces.

9. A device as defined in claim 6 wherein the connections between corresponding transducers of said first and second arrays include respective amplifiers.

10. A device as defined in claim 1 wherein said sweep means comprises an acousto-optical deflector for light rays forming said beam, an acoustic-wave generator coupled with said deflector, and oscillator means controlled by said source, said acoustic-wave generator being connected to said oscillator means for imparting supersonic vibrations to said deflector resulting in a periodic displacement of the beam-forming light rays.

11. A device as defined in claim 10 wherein said deflector is a crystal.

12. A device as defined in claim 10 wherein said first optical means comprises an emitter of a pencil of said beam-forming light rays trained upon said deflector and a set of cylindrical lenses in the path of the deflected light rays for transforming same into a parallel-ray bundle constituting said laminar beam.

13. A device as defined in claim 12 wherein said second optical means comprises lens means for focusing undiffracted rays of said bundle in any beam position onto a common point of convergence ahead of said receiving surface, and masking means at said point of convergence for blocking said undiffracted rays.

14. A device as defined in claim 1 wherein said focusing means comprises a single acoustic lens, said image space being located beyond said lens as seen from said second transducer means.

15. A device as defined in claim 1 wherein said focusing means comprises a concave acoustic reflector, said image space being located between said second transducer means and said reflector.

16. A device as defined in claim 1 wherein said receiving surface is part of an image-storing camera tube.

17. An echographic device for displaying, in real time, internal discontinuities of a test object to be examined, comprising:
first electroacoustic transducer means juxtaposable with the test object;
a source of recurrent ultrasonic-frequency electrical signals connected to said first transducer means for exciting same to emit original ultrasonic wave trains into said test object and to reconvert reflections of said original wave trains from internal object points into electrical echo signals;
second electroacoustic transducer means electrically connected to said first transducer means for receiving said echo signals therefrom and converting same into regenerated ultrasonic wave trains;
a transluminable interaction medium in contact with said second transducer means for insonification thereby, said medium transmitting the regenerated wave trains in a predetermined general direction of travel;
acoustic focusing means in said medium for concentrating said regenerated wave trains onto image points spatially correlated with respective reflecting object points whereby schlieren differing in density from the surrounding medium are temporarily generated at said image points, said focusing means including at least one acoustic mirror with a concave reflecting surface;
first optical means on one side of said medium for generating a light beam transluminating said medium and undergoing diffraction by said schlieren; and
second optical means on a side of said medium opposite said one side for focusing the diffracted beam portions upon a receiving surface to visualize said image points.

18. A device as defined in claim 17 wherein said focusing means further comprises a second acoustic mirror with a concave reflecting surface confronting the first-mentioned mirror and forming therewith an afocal pair, said mirrors being relatively offset in a direction transverse to said direction of travel.

19. An echographic device for displaying, in real time, internal discontinuities of a test object to be examined, comprising:
a first array of electroacoustic transducers juxtaposable with the test object;
a source of recurrent ultrasonic-frequency electrical signals connected to said first transducers in parallel for exciting same to emit original ultrasonic wave trains into said test object and to reconvert reflections of said original wave trains from internal object points into electrical echo signals;
a second array of electroacoustic transducers electrically connected to respective transducers of said first array for receiving said echo signals therefrom and converting same into regenerated ultrasonic wave trains;
a transluminable interaction medium in contact with said second array for insonification thereby, said medium transmitting the regenerated wave trains in a predetermined general direction of travel;
acoustic focusing means in said medium for concentrating said regenerated wave trains onto image points spatially correlated with respective reflecting object points whereby schlieren differing in density from the surrounding medium are temporarily generated at said image points, said focusing means including sound-emissive faces of the transducers of said second array disposed along an arc centered on a focal point within said medium;
first optical means on one side of said medium for generating a light beam transluminating said medium and undergoing diffraction by said schlieren; and
second optical means on a side of said medium opposite said one side for focusing the diffracted beam portions upon a receiving surface to visualize said image points.

20. A device as defined in claim 19 wherein said focusing means further includes an acoustic mirror with a concave reflecting surface centered on said focal point.

* * * * *